US010432748B2

United States Patent
Yellin et al.

(10) Patent No.: US 10,432,748 B2
(45) Date of Patent: *Oct. 1, 2019

(54) EFFICIENT CONTENT DELIVERY OVER WIRELESS NETWORKS USING GUARANTEED PREFETCHING AT SELECTED TIMES-OF-DAY

(71) Applicant: Tensera Networks Ltd., Adanim (IL)

(72) Inventors: Daniel Yellin, Raanana (IL); Ofir Shalvi, Raanana (IL); David Ben Eli, Modiin (IL); Eilon Regev, Givatayim (IL); Shimon Moshavi, Beit Shemesh (IL)

(73) Assignee: TENSERA NETWORKS LTD., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,453

(22) Filed: Mar. 27, 2018

(65) Prior Publication Data

US 2018/0219965 A1 Aug. 2, 2018

Related U.S. Application Data

(63) Continuation-in-part of application No. 14/691,597, filed on Apr. 21, 2015, now Pat. No. 9,961,159.

(60) Provisional application No. 62/025,021, filed on Jul. 16, 2014, provisional application No. 62/100,933, filed on Jan. 8, 2015, provisional application No. 62/521,563, filed on Jun. 19, 2017, provisional (Continued)

(51) Int. Cl.
*H04L 29/08* (2006.01)
*H04W 4/18* (2009.01)

(52) U.S. Cl.
CPC .......... *H04L 67/2847* (2013.01); *H04L 67/22* (2013.01); *H04W 4/18* (2013.01)

(58) Field of Classification Search
CPC ....... H04L 67/2847; H04L 67/22; H04W 4/18
USPC ........................................ 709/203
See application file for complete search history.

(56) References Cited

U.S. PATENT DOCUMENTS 8,902,777 B1   12/2014   Huang
9,160,968 B2   10/2015   Hines et al.
(Continued)

OTHER PUBLICATIONS

U.S. Appl. No. 15/285,503 office action dated May 10, 2018.
(Continued)

*Primary Examiner* — James E Springer
(74) *Attorney, Agent, or Firm* — Kligler & Associates

(57) ABSTRACT

A method for content delivery includes selecting one or more time intervals. During each time interval among the selected time intervals, given content is prefetched from a content source to a communication terminal using a guaranteed prefetching mode, by continuously tracking the given content on the content source, so as to detect changes to the given content as they occur during the selected time interval, and maintaining the communication terminal continuously synchronized with the content source with respect to the given content, throughout the selected time interval, notwithstanding the changes that occur during the selected time interval, by continuously prefetching at least part of the given content from the content source to the communication terminal. Outside of the one or more selected time intervals, the given content is prefetched using a best-effort prefetching mode, by tracking the given content less frequently than the guaranteed prefetching mode.

39 Claims, 2 Drawing Sheets

Related U.S. Application Data application No. 62/572,494, filed on Oct. 15, 2017, provisional application No. 62/597,447, filed on Dec. 12, 2017, provisional application No. 62/645,196, filed on Mar. 20, 2018.

(56) References Cited

U.S. PATENT DOCUMENTS

| | | |
|---|---|---|
| 9,811,501 B2 | 11/2017 | Kim et al. |
| 2004/0088375 A1 | 5/2004 | Sethi et al. |
| 2006/0277271 A1 | 12/2006 | Morse et al. |
| 2008/0232290 A1 | 9/2008 | Ezur et al. |
| 2012/0026908 A1 | 2/2012 | Tzannes et al. |
| 2014/0064138 A1 | 3/2014 | Urdang |
| 2014/0274078 A1 | 9/2014 | Hyde et al. |
| 2014/0344331 A1 | 11/2014 | Johns et al. |
| 2015/0172345 A1 | 6/2015 | Mantin et al. |
| 2016/0028637 A1 | 1/2016 | Vasseur et al. |
| 2016/0353268 A1 | 12/2016 | Senarath et al. |
| 2017/0048111 A1 | 2/2017 | Kodaypak |
| 2018/0159746 A1 | 6/2018 | Li et al. |

OTHER PUBLICATIONS

U.S. Appl. No. 15/285,506 office action dated Apr. 23, 2018.
U.S. Appl. No. 15/285,503 office action dated Dec. 14, 2018.
U.S. Appl. No. 15/285,506 office action dated Feb. 21, 2019.
EP Application # 15821969.1 office action dated Feb. 27, 2019.

EFFICIENT CONTENT DELIVERY OVER WIRELESS NETWORKS USING GUARANTEED PREFETCHING AT SELECTED TIMES-OF-DAY

CROSS-REFERENCE TO RELATED APPLICATIONS

This application is a Continuation-In-Part (CIP) of U.S. patent application Ser. No. 14/691,597, filed Apr. 21, 2015, which claims the benefit of U.S. Provisional Patent Application 62/025,021, filed Jul. 16, 2014, and U.S. Provisional Patent Application 62/100,933, filed Jan. 8, 2015. This application also claims the benefit of U.S. Provisional Patent Application 62/521,563, filed Jun. 19, 2017, U.S. Provisional Patent Application 62/572,494, filed Oct. 15, 2017, U.S. Provisional Patent Application 62/597,447, filed Dec. 12, 2017, and U.S. Provisional Patent Application 62/645,196, filed Mar. 20, 2018. The disclosures of these related applications are incorporated herein by reference.

FIELD OF THE INVENTION

The present invention relates generally to content delivery, and particularly to methods and systems for content delivery to communication terminals.

BACKGROUND OF THE INVENTION

Various techniques are known in the art for delivering content to wireless users. For example, U.S. Pat. No. 8,601,052, whose disclosure is incorporated herein by reference, describes a method and system for performing content pre-fetching for a wireless portable computing device (PCD).

As another example, U.S. Patent Application Publication 2010/0161831, whose disclosure is incorporated herein by reference, describes a content and traffic managing system. A mobile device is connectable to users and to content providers via communication links. The system tracks various parameters over time, and schedules communication in relation to predefined or projected content responsive to user content-related behavior, user communication behavior, user external behavior, and parameters of communication links.

SUMMARY OF THE INVENTION

An embodiment of the present invention that is described herein provides a method for content delivery including selecting one or more time intervals. During each time interval among the selected time intervals, given content is prefetched from a content source to a communication terminal using a guaranteed prefetching mode, by continuously tracking the given content on the content source, so as to detect changes to the given content as they occur during the selected time interval, and maintaining the communication terminal continuously synchronized with the content source with respect to the given content, throughout the selected time interval, notwithstanding the changes that occur during the selected time interval, by continuously prefetching at least part of the given content from the content source to the communication terminal. Outside of the one or more selected time intervals, the given content is prefetched from the content source to the communication terminal using a best-effort prefetching mode, by tracking the given content less frequently than the guaranteed prefetching mode.

In some embodiments, selecting the time intervals includes selecting one or more first time intervals for a first content item, and selecting one or more second time intervals, different from the first time intervals, for a second content item different from the first content item. In other embodiments, selecting the time intervals includes selecting one or more first time intervals when the communication terminal belongs to a first group of communication terminals, and selecting one or more second time intervals, different from the first time intervals, when the communication terminal belongs to a second group of communication terminals different from the first group. In an embodiment, selecting the time intervals includes applying the guaranteed prefetching mode continuously for a specified content item.

In some embodiments, selecting the time intervals includes assigning, to portions of the given content, respective visibility metrics that are indicative of one or more of (i) respective times and (ii) respective amounts of user actions, needed to make the portions of the given content visible to a user, and selecting the time intervals based on the visibility metrics. In an example embodiment, selecting the time intervals includes choosing whether to apply the guaranteed prefetching mode or the best-effort prefetching mode to a portion of the given content, depending on a visibility metric assigned to the portion. In another embodiment, the method includes setting a length of time during which a portion of the given content is prefetched using the guaranteed prefetching mode, depending on a visibility metric assigned to the portion.

In a disclosed embodiment, selecting the time intervals includes applying the guaranteed prefetching mode for prefetching a portion of the given content that is visible without scrolling when presented on the communication terminal, and applying the best-effort prefetching mode for prefetching a part of the given content that requires scrolling to be visible.

In another embodiment, the method includes, for first content that is visible without scrolling when presented on the communication terminal, applying the guaranteed prefetching mode during first time intervals, and for second content that requires scrolling to be visible, applying the guaranteed prefetching mode during second time intervals, shorter than the first time intervals. In yet another embodiment, selecting the time intervals includes applying the guaranteed prefetching mode for prefetching a portion of the given content that is available on a landing page of an application, and applying the best-effort prefetching mode for prefetching a part of the given content that is not available on the landing page.

In still another embodiment, selecting the time intervals includes applying the guaranteed prefetching mode for prefetching a portion of the given content that is accessible from a current display of the communication terminal, and applying the best-effort prefetching mode for prefetching a part of the given content that is not accessible from the current display.

In an embodiment, selecting the time intervals includes activating the guaranteed prefetching mode in response to an output of a sensor in the communication terminal. In various embodiments, selecting the time intervals includes activating the guaranteed prefetching mode depending on one or more of a movement of the communication terminal, a velocity of the communication terminal, exposure of the communication terminal to light, a screen-lock status of the communication terminal, a battery level of the communication terminal, a charging status of the communication terminal, a quality of a network connection of the communication terminal, and a type of the network connection.

In an embodiment, selecting the time intervals includes applying the guaranteed prefetching mode for prefetching a portion of the given content that is to be prefetched over a broadcast or multicast channel.

In another embodiment, selecting the time intervals includes applying the guaranteed prefetching mode for prefetching a portion of the given content that changes at a rate that is lower than a predefined threshold, and applying the best-effort prefetching mode for prefetching a part of the given content that changes at a rate that is above the predefined threshold. In yet another embodiment, selecting the time intervals includes applying the guaranteed prefetching mode for prefetching a portion of the given content having a level of security that is above a predefined threshold, and applying the best-effort prefetching mode for prefetching a part of the given content having a level of security that is below the predefined threshold.

In a disclosed embodiment, prefetching the given content includes delivering to the communication terminal one or more differential updates, relative to content that is already available in the communication terminal. In an embodiment, continuously tracking the given content includes executing, in a network-side node, an executable script that is found in the given content, and identifying and prefetching content accessed by the script. In an embodiment, prefetching the given content includes prefetching an executable script that is found in the given content, executing the prefetched script in advance in the communication terminal, and further prefetching content accessed by the script.

There is additionally provided, in accordance with an embodiment of the present invention, a content delivery system including an interface and one or more processors. The interface is configured for communicating with a content source and with a communication terminal of a user. The one or more processors are configured to select one or more time intervals, during each time interval among the selected time intervals, to prefetch given content from the content source to the communication terminal using a guaranteed prefetching mode, by continuously tracking the given content on the content source, so as to detect changes to the given content as they occur during the selected time interval, and maintaining the communication terminal continuously synchronized with the content source with respect to the given content, throughout the selected time interval, notwithstanding the changes that occur during the selected time interval, by continuously prefetching at least part of the given content from the content source to the communication terminal, and, outside of the one or more selected time intervals, to prefetch the given content from the content source to the communication terminal using a best-effort prefetching mode, by tracking the given content less frequently than the guaranteed prefetching mode.

There is further provided, in accordance with an embodiment of the present invention, a computer software product, the product including a tangible non-transitory computer-readable medium in which program instructions are stored, which instructions, when read by one or more processors of a content delivery system that communicates with a content source and a communication terminal of a user, cause the one or more processors to select one or more time intervals, during each time interval among the selected time intervals, to prefetch given content from the content source to the communication terminal using a guaranteed prefetching mode, by continuously tracking the given content on the content source, so as to detect changes to the given content as they occur during the selected time interval, and maintaining the communication terminal continuously synchronized with the content source with respect to the given content, throughout the selected time interval, notwithstanding the changes that occur during the selected time interval, by continuously prefetching at least part of the given content from the content source to the communication terminal, and, outside of the one or more selected time intervals, to prefetch the given content from the content source to the communication terminal using a best-effort prefetching mode, by tracking the given content less frequently than the guaranteed prefetching mode.

Another embodiment of the present invention that is described herein provides a method for content delivery including defining a guaranteed prefetching mode, in which content is continuously prefetched from a content source to a communication terminal of a user so as to maintain the communication terminal synchronized with the content source. One or more time-of-day intervals, during which the user is expected to access given content, are identified. During the identified time-of-day intervals, the given content is prefetched from the content source to the communication terminal using the guaranteed prefetching mode.

In some embodiments, the method further includes defining a best-effort prefetching mode that is different from the guaranteed prefetching mode, and prefetching the given content to the communication terminal using the best-effort prefetching mode outside the identified time-of-day intervals. In an embodiment, prefetching using the guaranteed prefetching mode includes prefetching less than a threshold percentage of content items that are detected as changed, and prefetching using the best-effort prefetching mode includes prefetching more than the threshold percentage of the content items detected as changed.

In some embodiments, prefetching the given content using the guaranteed prefetching mode includes detecting changes in the given content continuously during the identified time-of-day intervals, and prefetching the changes or the changed content to the communication terminal. Detecting the changes may include continuously crawling the content items on the content source. Additionally or alternatively, detecting the changes may include receiving from the content source notifications indicative of the changes.

In an embodiment, identifying the time-of-day intervals includes monitoring a usage pattern of the communication terminal by a software agent installed in the communication terminal, and identifying the time-of-day intervals based on the usage pattern. In another embodiment, identifying the time-of-day intervals includes monitoring a temporal pattern of content changes in the content source, and identifying the time-of-day intervals based on the pattern of content changes.

In yet another embodiment, the method includes deciding to prefetch a content item using the guaranteed prefetching mode in response to an instantaneous feature of the content item. In a disclosed embodiment, prefetching the given content includes indicating to the communication terminal one or more candidate content items for prefetching, selecting by the communication terminal one or more of the candidate content items, and prefetching the selected content items by the communication terminal.

In another embodiment, prefetching the given content includes indicating to the communication terminal a first signature of a content item to be prefetched, prefetching the content item by the communication terminal, computing a second signature over the prefetched content item, and caching the content item in the communication terminal only if the first signature matches the second signature. In some embodiments, the method includes visually marking one or more content items presented to the user as prefetched.

There is additionally provided, in accordance with an embodiment of the present invention, a content delivery system including an interface and one or more processors. The interface is configured for communicating with a content source and with a communication terminal of a user. The one or more processors are configured to hold a definition of a guaranteed prefetching mode, in which content is continuously prefetched from the content source to the communication terminal so as to maintain the communication terminal synchronized with the content source, to identify one or more time-of-day intervals during which the user is expected to access given content, and, during the identified time-of-day intervals, to prefetch the given content from the content source to the communication terminal using the guaranteed prefetching mode.

There is further provided, in accordance with an embodiment of the present invention, a computer software product, the product including a tangible non-transitory computer-readable medium in which program instructions are stored, which instructions, when read by one or more processors of a content delivery system that communicates with a content source and a communication terminal of a user, cause the one or more processors to hold a definition of a guaranteed prefetching mode, in which content is continuously prefetched from the content source to the communication terminal so as to maintain the communication terminal synchronized with the content source, to automatically identify one or more time-of-day intervals during which the user is expected to access given content, and, during the identified time-of-day intervals, to prefetch the given content from the content source to the communication terminal using the guaranteed prefetching mode.

The present invention will be more fully understood from the following detailed description of the embodiments thereof, taken together with the drawings in which:

DETAILED DESCRIPTION OF EMBODIMENTS

Overview

Figure 1:
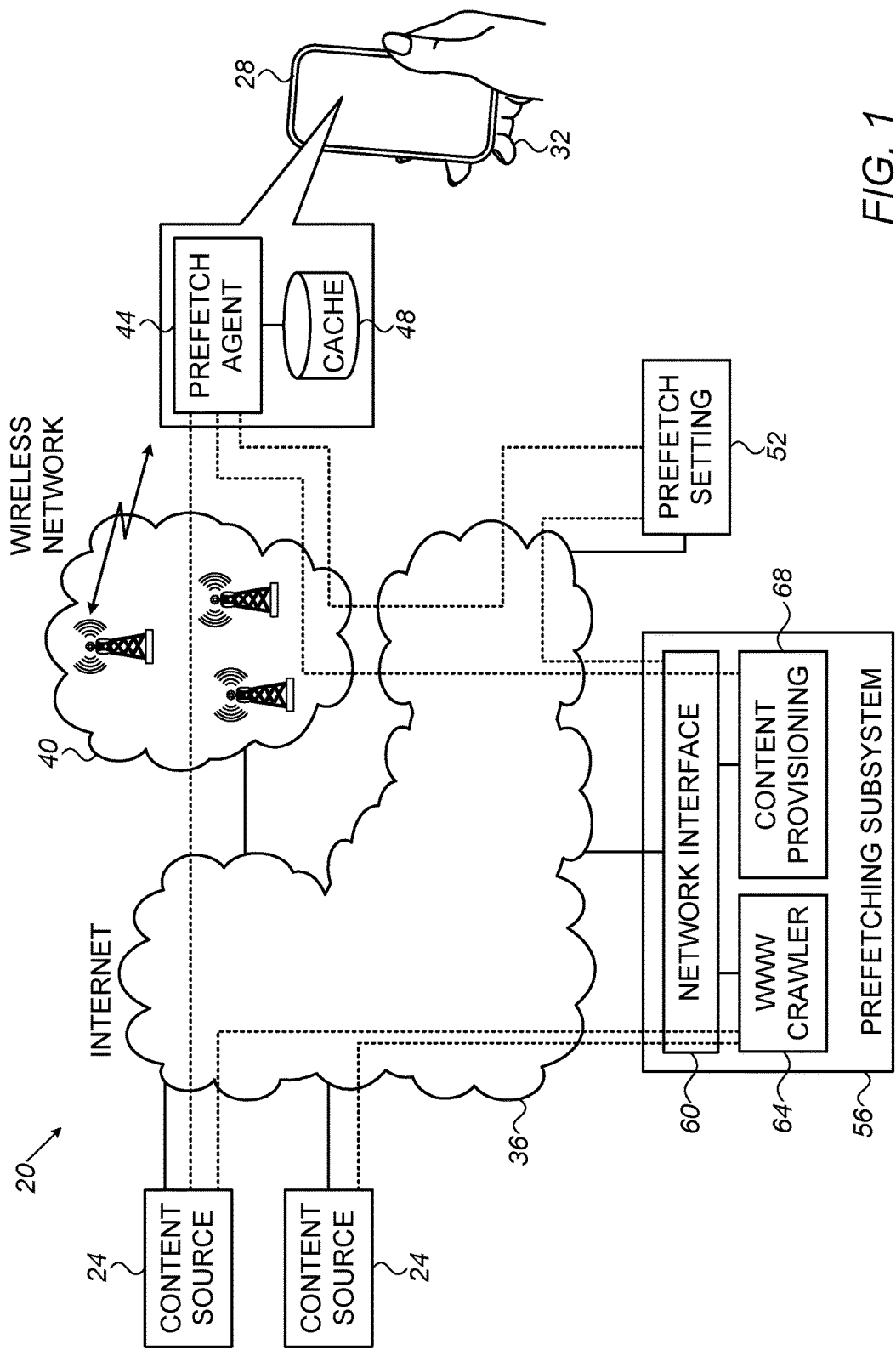
FIG. 1 is a block diagram that schematically illustrates a content delivery system, in accordance with an embodiment of the present invention.

Embodiments of the present invention that are described herein provide improved methods and systems for delivering content to smartphones, tablet computers and other wireless communication terminals. In the disclosed embodiments, a content delivery system prefetches content from content sources, such as Web sites, for consumption by wireless communication terminals. For a given terminal and given content, the system uses at least two operational modes—A guaranteed prefetching mode and a best-effort prefetching mode.

In the guaranteed prefetching mode, the system continuously tracks changes in the given content, and ensures that the content cached in the terminal is continuously synchronized with the content at the content source. Such continuous synchronization may be implemented, for example, by continuously crawling the content items (e.g., Web pages) of the given content and prefetching any content item that has changed. When operating in the guaranteed mode, user requests to access the given content will be served from the terminal's cache with very high probability, thereby providing small latency and enhanced user experience.

In the best-effort prefetching mode, no such guarantee is given, and prefetching is performed as feasible using the available resources. The best-effort mode incurs considerably less system resources than the guaranteed mode, but on the other hand offers reduced user experience due to the higher probability of cache miss that requires fetching of content from the content source.

In other words, in the guaranteed prefetching mode the system maintains continuous synchronization between the content source and the cache of the terminal, with respect to given content. During each time interval in which the guaranteed prefetching mode is applied, the system continuously tracks the given content on the content source, so as to detect changes to the given content immediately as they occur. The system maintains the cache of the terminal continuously synchronized with the content source, throughout the time interval, notwithstanding the changes that occur during the time interval, by continuously prefetching at least part of the given content from the content source to the communication terminal. Outside the time intervals in which guaranteed prefetching is applied, the system prefetches the given content from the content source to the communication terminal using the best-effort prefetching mode, by tracking the given content less frequently than the guaranteed prefetching mode.

For a given terminal and given content, the system typically identifies one or more time-of-day intervals during which the user is expected to access the content. The system prefetches the content to the terminal using the guaranteed mode during the identified time-of-day intervals, and using the best-effort mode otherwise. In various embodiments, the system automatically identifies the time-of-day intervals based on various factors, such as the user's content consumption pattern over time, the user's geographical location pattern over time, and the availability of different wireless connectivity options at different times and locations. These characteristics can be studied, for example, using a software agent installed in the terminal.

The disclosed techniques are typically used for serving a large number of terminals that consume diverse content from various content sources. By using the disclosed techniques, each user is given guaranteed fast content access during selected times-of-day in which the content is actually needed. At other times, system resources are assigned to other users. Thus, the disclosed techniques are highly effective in maximizing the utilization of available communication and content delivery resources, while retaining high-quality user experience.

System Description

FIG. 1 is a block diagram that schematically illustrates a content delivery system 20, in accordance with an embodiment of the present invention. System 20 prefetches content from one or more content sources 24 for use by one or more wireless communication terminals operated by users 32. A system of this sort may be 28 operated, for example, by content providers or by wireless service providers.

Content sources 24 may comprise, for example, Web sites, portals, Content Delivery Networks (CDNs), data centers or any other suitable type of data sources. Terminals 28 may comprise, for example, cellular phones, smartphones, tablet computers, laptop computers or any other suitable device that is capable of presenting content to a user and has wireless communication capabilities. In the present context, the term "prefetching" refers to transfer of content from a content source to a wireless terminal that is performed not in response to a direct request for that content by the user.

The various elements of system 20, as well as content sources 24 and terminals 28, communicate with one another over one or more wired or wireless communication networks. In the present example, content sources 24 are accessed over the Internet 36, and terminals 28 access the Internet via a wireless network 40, e.g., a cellular network. The end-to-end content paths from the content sources to the terminals therefore typically comprise both wired and wireless links.

In the example of FIG. 1, system 20 comprises a prefetching subsystem 56 and a prefetch setting unit 52 connected to the Internet, and a respective prefetch agent 44 installed in each terminal 28. Each terminal 28 further comprises a respective content cache 48, for temporarily storing content items. Content items (e.g., Web pages) that are cached in cache 48 can be served to user 32 (e.g., displayed on a browser or an App running in the terminal) with small latency, without incurring the latency of content retrieval from content source 24.

Prefetch subsystem 56 comprises a network interface 60 for connecting to Internet 36, a crawler 64 and a content provisioning unit 68. Crawler 64 is configured to crawl content items in data sources 24, detect changes in content and retrieve selected content items. Content provisioning unit 68 is configured to notify agent 44 in the terminal of available content for prefetching, to coordinate the transfer of this content with agent 44, and to pre-process the content prior to delivery. In the present context, the term "change" refers both to existing content items whose content has been updated, and to newly-generated content items.

In various embodiments, provisioning unit 68 may use a number of efficient existing techniques to send notifications to agent 44, such as the Goggle Cloud Messaging (GCM) service for Android devices or Apple Push Notification (APN) for iOS devices.

Agent 44 is typically configured to manage cache 48, to intercept content requests generated in terminal 28, and to serve the requested content from the cache or from the content sources as appropriate. In some embodiments, agent 44 is also configured to track usage patterns for assisting the prefetching operation, as will be described below. Agent 44 may track, for example, the content consumption pattern of the user as a function of time, the geographical location of the terminal as a function of time, and the availability of different communication capabilities (e.g., the available bandwidth or the availability of Wi-Fi vs. cellular access) at different times. Agent 44 may also track the characteristics of various available communication channels (e.g., Wi-Fi or cellular), such as congestion level, speed, latency, receiver signal-to-noise ratio (SNR), receiver channel quality indicator (CQI), and/or any other suitable parameters.

Agent 44 typically provides the collected information to prefetch setting unit 52. In some embodiments agent 44 may track, log and report additional information, such as terminal status (e.g., battery status, available memory or CPU resources, or error events) or network status (network speed and load, or availability of Wi-Fi connectivity).

Agent 44 may utilize some of the collected information to decide whether or not to prefetch content, in accordance with a high-level prefetch policy provided by prefetch setting unit 52. For example, agent 44 may decide to prefetch content only if the current receiver SNR value is higher than a certain threshold provided by prefetch setting unit 52.

Prefetch setting unit 52 is typically configured to decide, based on the available information, which content is to be prefetched for which terminal, at what times and using which prefetching mode. The use of different prefetching modes is described in greater detail below.

The configurations of system 20 and its various elements shown in FIG. 1 are example configurations, which are chosen purely for the sake of conceptual clarity. In alternative embodiments, any other suitable configurations can be used. For example, the functions of prefetching subsystem 56 and prefetch setting unit 52 can be implemented using any desired number of processors, or even in a single processor. The various system functions can be partitioned among the processors in any suitable way. In one embodiment, prefetch setting unit 52 is implemented as a cloud application.

In another embodiment, the functions of unit 52 may be split between the cloud application and prefetch agent 44 in the user terminal. In such an embodiment, the cloud application can make prefetching decisions based on usage patterns, but agent 44 may override these decisions based on available battery power or other local parameters. In other words, the cloud application may identify to agent 44 candidate content items for prefetching, and agent 44 may select and prefetch one or more of the candidate items, in accordance with any suitable criterion. In this manner, it may be possible to reduce or eliminate the need to report local parameters from agent 44 to unit 52.

As another example, prefetch agent 44 may intercept content requests in terminal 28 in various ways. In one embodiment, agent 44 is embedded in an application running in terminal 28, or as a Software Development Kit (SDK) embedded in an application. In another embodiment, terminal 28 may run a proxy server, which is controlled by agent 44 and is exposed to incoming and outgoing traffic. Further alternatively, the disclosed techniques can be implemented entirely on the network side without an agent.

Although the embodiments described herein refer mainly to human users 32, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 48 may be implemented using any suitable memory or storage device. In some embodiments, agent 44, prefetch setting unit 52, crawler 64 and/or provisioning unit 68 are implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Content Delivery Using Guaranteed and Best-Effort Prefetching Modes

Consider a certain terminal 28 operated by a certain user 32. In many practical cases, a specific user 32 accesses content using terminal 28 in accordance with some predictable time-of-day usage pattern. For example, the user will typically access specific data sources (e.g., Web sites), or even specific content items (e.g., Web pages) within specific data sources, at characteristic times-of-day. The user and terminal may also move geographically in accordance with some predictable time-of-day pattern. The geographical location of the terminal may have an impact on the quality of the available communication channel at different times-of-day.

Additionally or alternatively, the communication resources available to the terminal (e.g., Wi-Fi vs. cellular access, or high vs. low bandwidth) may also vary in accordance with some predictable time-of-day pattern. Other kinds of usage patterns may be obtained from readings of various sensors of terminal 28. For example, accelerometer readings may indicate that terminal 28 is stationary for a long time period, which may lead to a conclusion that the user is most likely inactive and there is no reason to prefetch content for him.

All of the time-of-day patterns listed above, as well as other suitable patterns, are referred to herein collectively as usage patterns. In the present context, the term "time-of-day pattern" refers to any temporal pattern that shows some characteristic behavior as a function of the time-of-day. Some time-of-day patterns may differ for different days, e.g., exhibit different behavior on weekdays and weekends or on different days of the month, for example. In some disclosed embodiments, system 20 learns the usage patterns of different users and terminals, and uses this information to optimize prefetching of content to the terminals.

In some embodiments, system 20 defines a guaranteed prefetching mode and a best-effort prefetching mode, for use in prefetching content from data sources 24 to cache memories 48 of terminals 28. In the guaranteed mode, prefetching subsystem 56 continuously tracks changes in content, and provisioning unit 68 ensures that the content cached in cache 48 of the terminal is continuously synchronized with the content at the content source. In the best-effort mode, prefetching subsystem 56 prefetches content as feasible using available resources.

Typically, when using the guaranteed prefetching mode, system 20 prefetches less than a threshold percentage of the content items that were detected as changed. When using the best-effort prefetching mode, on the other hand, system 20 typically prefetches more than the threshold percentage of the content items detected as changed. The threshold percentage may comprise, for example, 80%, 90%, or any other suitable value.

In some embodiments, content that is prefetched or content that is currently in guaranteed prefetch mode can be visually marked as such by agent 44, so that the user will be aware of it. For example, a specific icon on an image of a video clip may visually mark to the user that this clip was prefetched by the system, and thus the user should expect flawless presentation of that clip.

In some embodiments, crawler 64 crawls content sources 24 and detects content changes regardless of any specific terminal, user, usage pattern or operational mode. Provisioning unit 68, on the other hand, operates differently per terminal, depending on the usage patterns and depending on whether the terminal currently operates in the guaranteed prefetching mode or in the best-effort prefetching mode.

It should be noted that even in the guaranteed prefetching mode, some residual degree of mis-synchronization may remain between content source 24 and cache 48, for example due to various latencies across the system. This residual mis-synchronization is typically very small, and is still regarded as "guaranteed prefetching." Such latencies may exist in conventional user access to the network, regardless of the disclosed prefetching schemes.

Additionally or alternatively, some level of maximal allowable prefetching "cost" may be pre-specified for the guaranteed prefetching mode, so that when prefetching is expected to incur resources beyond the pre-specified cost, the content will not be prefetched. Such a cost may be defined in terms of the battery energy needed for prefetching (e.g., do not prefetch if the required energy exceeds a threshold), the overall battery level (e.g., do not prefetch if the battery energy level is below a threshold), or any other suitable resource.

Further additionally or alternatively, system 20 may specify that certain types of content items do not have to be prefetched even if changed, even in the guaranteed prefetching mode. Lack of synchronization with respect to such content items is still considered "guaranteed prefetching." Content items that do not need to be prefetched may comprise, for example, talkbacks or other items whose probability of consumption by the user is small enough.

Thus, the guaranteed mode has a considerably lower cache-miss probability (a considerably lower probability that content requested by the user will not be found in cache 48 and will need to be fetched from the content source) than the best-effort mode. In either mode, the crawling schedule of crawler 64 (e.g., the update cycle and/or order of crawling) may be set (e.g., by unit 52) based on past pattern of content changes in that content source and/or based on the usage pattern of the user.

For a given terminal and given content (e.g., a given Web site or set of Web sites, or designated Web pages or regions within Web sites) alternation between the guaranteed and best-effort modes is specified by prefetch setting unit 52, based on the usage patterns of the terminal, the change pattern of the content, and/or the instantaneous conditions of the terminal and content.

Unit 52 typically identifies one or more time-of-day intervals during which the user characteristically accesses the given content. Unit 52 notifies prefetch subsystem 56 of the identified time-of-day intervals. Subsystem 56 prefetches the given content to the terminal using the guaranteed mode during the identified time-of-day intervals, and using the best-effort mode outside the identified time-of-day intervals.

In some embodiments, unit 52 may consider additional factors other than the usage patterns in selecting the time-of-day intervals for guaranteed prefetching. Such additional factors may comprise, for example, instantaneous features of content items, such as the instantaneous rating or popularity of given content items. The rating of a content item for a given user may be determined, e.g., by unit 52, over various groups of users, such as users known to have similar taste, content consumption habits or behavioral pattern to the given user.

Consider, for example, a content item whose instantaneous rating is very high, such as an important sports match. In an embodiment, such an occurrence causes prefetching setting unit 52 to switch terminals 28 whose users 32 are known to be potentially interested in such content to the guaranteed prefetching mode. The switch may occur even if the circumstances do not match the typical usage patterns or location patterns of the users.

Additional factors that unit 52 may consider in selecting the time-of-day intervals for guaranteed prefetching comprise instantaneous conditions of the terminal, such as battery condition, data plan condition or sensor readings, as described above. In such embodiments, unit 52 may aim to reduce communication cost for the terminal (e.g., by considering price plans and communication rates of the user), reduce content cost incurred by the content source, or reduce battery energy consumption. As noted above, unit 52 may also consider the instantaneous rating of current content items, or the behavior of other users that are known to have similar behavioral patterns to the given user.

As noted above, unit 52 may conclude that some users exhibit a rare and/or sporadic content usage. Unit 52 may decide that it is not cost effective to invest resources in improving the user experience of these users. For such users, unit 52 may select no intervals of continuous guaranteed mode, or even no prefetching at all.

As can be appreciated, the guaranteed mode consumes considerable system resources—e.g., resources of crawler 64, communication overhead among content source 24, subsystem 56 and terminal 28, etc. By restricting the use of this mode to selected time-of-day intervals, which often differ among different terminals, system resources can be utilized efficiently.

Figure 2:
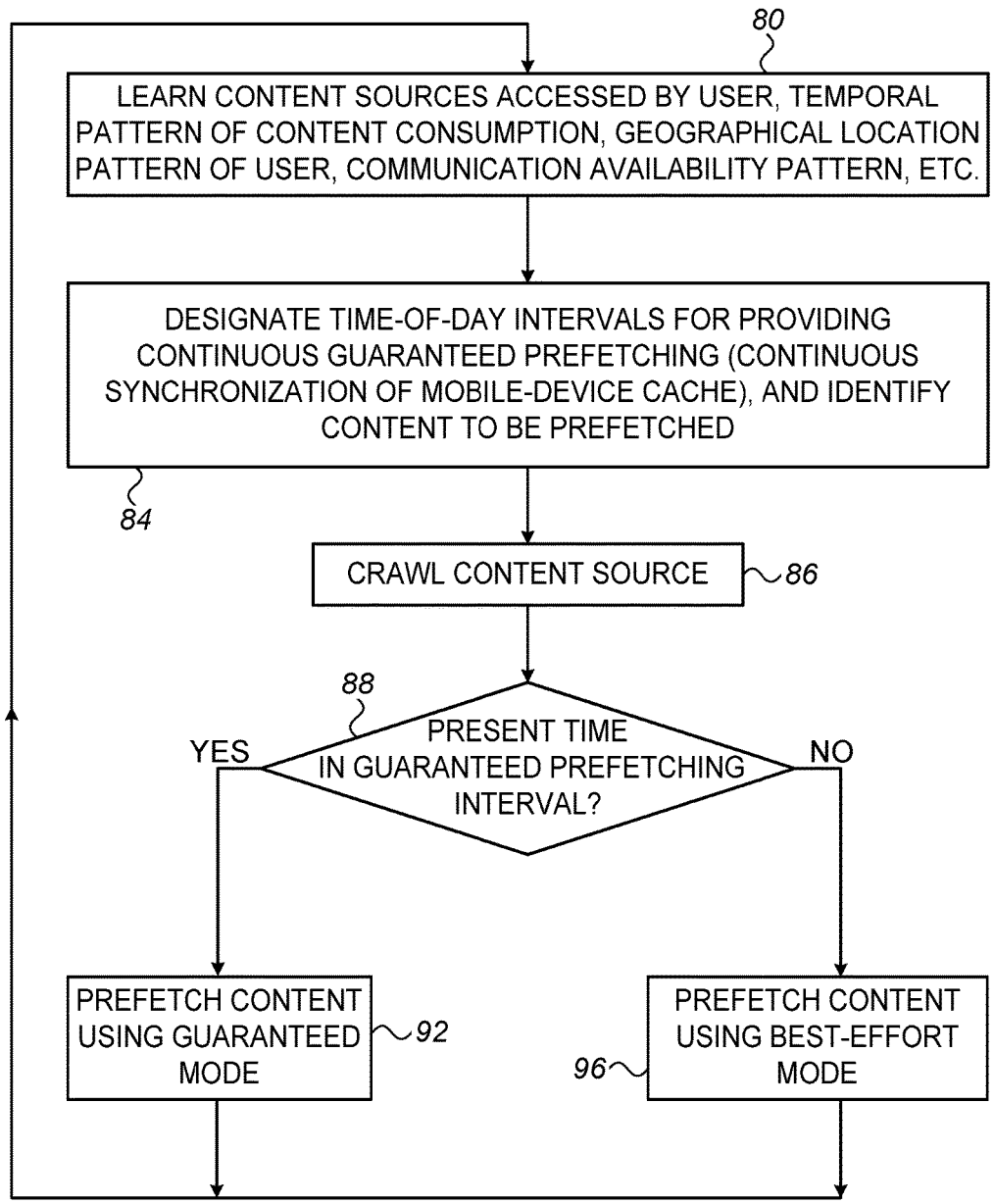
FIG. 2 is a flow chart that schematically illustrates a method for content delivery, in accordance with an embodiment of the present invention.

FIG. 2 is a flow chart that schematically illustrates a method for content delivery, in accordance with an embodiment of the present invention. The method begins with prefetch setting unit 52 learning the usage patterns of a given terminal in accessing given content, at a usage learning step 80. As explained above, the learning step is typically based on information provided by agent 44, information regarding content change pattern that may be provided by crawler 64, and/or information regarding the instantaneous content item features.

Based on this information, unit 52 designates one or more time-of-day intervals for guaranteed prefetching of the given content to the given terminal, at an interval selection step 84. If the given terminal is found to be inactive or rarely active, unit 52 may refrain from assigning it any time-of-day intervals for guaranteed prefetching.

At a crawling step 86, crawler 64 crawls content sources 24 and detects changes in content. At a time checking step 88, prefetching subsystem 56 checks whether the current time is within one of the designated time-of-day intervals. If so, subsystem 56 prefetches the given content to cache 48 of the given terminal using the guaranteed prefetching mode, at a guaranteed prefetching step 92. Otherwise, i.e., if the current time is outside the designated time-of-day intervals, subsystem 56 prefetches the given content to the given terminal using the best-effort prefetching mode, at a best-effort prefetching step 96. In either case, the method then loops back to step 80, in which unit 52 continues to learn and update the usage patterns of the terminal in question.

Additional Variations and Embodiments

In various embodiments, content provisioning unit 68 and agent 44 may use various protocols for coordinating the transfer of prefetched content. In some embodiments, unit 68 sends to agent 44 notifications, which indicate content items that are outdated in cache 48 (because crawler 64 has identified that the corresponding content items in content sources 24 have changed). Agent 44 requests the up-to-date content items from unit 68 in response to the notifications.

In an example embodiment, unit 68 sends agent 44 a catalog that lists the outdated content items for a given point in time. In an alternative embodiment, unit 68 sends agent 44 a catalog holding the latest version numbers of various content items, e.g., of all content items that are of interest to the user. Agent 44 decides, per content item, if the version it holds is outdated and if so, may prefetch a new version. The latter implementation is sometimes preferable, since unit 68 may not always have complete information as to which version of which content item is available in cache 48. For example, unit 68 may be unaware of items that are deleted from cache 48 and of previous prefetch attempts that have failed.

In some embodiments, the prefetching operation itself does not have to involve unit 68. For example, agent 44 may prefetch outdated content items from other Web sites or content sources. In an embodiment, the catalog sent from unit 68 indicates the locations (e.g., URLs or URIs) from which agent 44 should fetch the content items.

In some embodiments, the catalog sent from unit 68 to agent 44 may specify a respective likelihood score for each content item. Items having high likelihood scores may be prefetched by agent 44 even at high cost (e.g., in spite of a slow cellular connection) whereas items having lower likelihood scores may only be prefetched at lower cost (e.g., when a free high-speed Wi-Fi connection is available).

In some embodiments, the catalog sent from unit 68 to agent 44 comprises means for verifying the correctness of content items that will be prefetched by agent 44. Such means may comprise, for example, a signature computed over the correct content item, such as a Cyclic Redundancy Check (CRC) value, a Message Digest 5 (MD5) hash value or other error detection code. In these embodiments, after prefetching a content item, agent 44 calculates the signature over the prefetched item, compares it with the signature in the catalog, and saves the prefetched item in cache 48 only if the two signatures match. This technique is useful, for example, for mitigating various attacks on the prefetching service and for generally mitigating erroneous prefetching.

In the examples above, guaranteed prefetching of given content is confined to selected time-of-day intervals. Additionally, in an embodiment, system 20 may define specific content as warranting continuous guaranteed prefetching. System 20 will typically prefetch this specific content using the guaranteed prefetching mode unconditionally, regardless of whether the current time falls inside or outside the selected time-of-day intervals.

Content provisioning unit 68 may provision the content retrieved from content sources 24 in various ways, before delivering the content to terminal 28. For example, unit 68 may compress the content so as to reduce communication bandwidth. Any suitable compression scheme can be used for this purpose. In an example embodiment, unit 68 may send only the differences relative to the content that is already cached in the terminal, or otherwise compress the content relative to the previously-cached content.

As another example, unit 68 may manipulate the content in a manner that facilitates its delivery or consumption at the terminal. For example, if the content comprises client-side scripts (e.g., JavaScript scripts embedded in an HTML page), unit 68 may execute the client-side scripts, fetch any additional content accessed by the scripts, and modify the HTML page accordingly. In other words, unit 68 may deliver to terminal 28 content items that originally contained client-side scripts, and appear to the user as if the scripts were executed on the client side as intended, even though the scripts are in fact executed on the network side by unit 68.

In other embodiments, unit 68 encrypts the content items before sending them to agent 44, and agent 44 decrypts the received content items. Encryption is useful, for example, for mitigating attacks on the prefetching service and for enhancing copyright protection.

In other embodiments, unit 68 may manipulate the content items to facilitate efficient transmission to multiple terminals 28. For example, unit 68 may partition a content item into a common part (e.g., a feed consumed by all users of the portal) and a user-specific part (e.g., an article that may be of interest to only a subset of the users). Unit 68 may then transmit the common part jointly to multiple users over a broadcast channel, rather than sending the same content part separately to each user. An example of a broadcast channel may comprise the evolved Multimedia Broadcast Multicast Service (eMBMS) channel of the Long-Term Evolution (LTE) cellular standard.

In some embodiments, agent 44 may operate when terminal 28 is inactive, e.g., in idle state, or when the application in which the agent is embedded is inactive. For example, agent 44 may occasionally wake-up at least part of terminal 28, perform prefetching and/or measurements and switch back to idle state, all transparently to the user. In an embodiment, agent 44 attempts to coordinate at least some of its wake-up periods with those of the terminal's operating system, in order to reduce power consumption.

Upon receiving from unit 68 a notification indicating an outdated cached content item, agent 44 and unit 68 may apply any suitable prefetching policy for prefetching the updated version of the content item. In some embodiments, the updated content item may be sent together with (or instead of) the notification. This policy may be advantageous for small content items (or for small differences in content items, e.g., when differential compression is utilized). For large content items, it may be preferable to send the notification first, and to allow agent 44 some flexibility in choosing the preferred time for prefetching (e.g., when a suitable network type or conditions or device resource are available). The pre-fetching policy is typically terminal-specific.

In an embodiment, unit 52 is responsible for generating the terminal-specific prefetching policy and sending it (e.g., occasionally or periodically) to agent 44. The policy may be defined, for example, based on learning the behavior of user 32, terminal 28 and network 40, as derived from the usage patterns and other information sent by agent 44. Additionally or alternatively, the policy may be defined based on the behavior of content sources 24, as learned and reported by crawler 64. Content-source behavior may relate, for example, to patterns of changes to content, size of changes and other factors.

Additionally or alternatively, unit 52 may define the prefetching policy depending on criteria such as improving user experience, reducing communication cost or reducing power consumption. For example, unit 52 may give preference to setting the guaranteed-prefetch time-of-day intervals to times in which the terminal is connected to Wi-Fi (and thus has high bandwidth at low cost), or at times in which channel and network conditions are favorable (and therefore content can be transferred with high data rate and low energy consumption). Additionally or alternatively, when the content is available for prefetching from two or more content sources (e.g., different CDNs), unit 52 may choose the lowest-cost source among the alternative sources. The lowest-cost content source may well be a high-latency source, but this fact usually does not affect the user experience when using prefetching.

In some embodiments, crawler 64 may be omitted. For example, in some embodiments a content source provides system 20 (e.g., unit 52 and/or subsystem 56) with explicit notifications of content changes. In such a case, these notification may trigger prefetching directly without a need to crawl the content source. As another example, the data source may generate an RSS feed, in which case the RSS feed can be monitored instead of the content items themselves. As yet another example, the content source may hold an index (e.g., an XML file) of the state of the content or feed. The content source may notify system 20 of changes to the index, obviating the need for crawling. Additionally or alternatively, system 20 may trigger prefetching on any other suitable indication of content change.

In the description of FIG. 1 above, crawler 64 retrieves and delivers updated versions of content items to content provisioning unit 68. In alternative embodiments, the crawler may deliver pointers (e.g., Uniform Resource Identifiers—URIs) that point to the locations of content items that have changed, instead of the actual content. Unit 68 delivers the pointers to agent 44 in terminal 28, which then retrieves the updated content items using the pointers.

In some embodiments, crawler 64 crawls only the main pages of the data source (or feed). In alternative embodiments, crawler 64 crawls internal, lower-level pages, as well. The crawling depth may also be specified by unit 52 as part of the prefetching policy.

Prefetching subsystem 56 may use any suitable technique for signaling to agent 44 that content items are outdated. For example, each content item may be assigned a version number, which is incremented when the content is updated. A content item whose version number in the content source is newer than the version number in cache 48 of terminal 28 may be regarded as outdated. Prefetching subsystem 56 may use the version number for sending only the differences between the old and new versions while retaining data integrity.

In an embodiment, unit 68 may identify content items that are updated regularly at a fast rate (e.g., content relating to an on-going sports event), and mark them as "non-versioned." In this embodiment, agent 44 will prefetch a non-versioned content item whenever it fetches other content items, but not otherwise, or alternatively avoid prefetching such items altogether and delete them from the cache. Once the frequent changes of a given non-versioned content item stop, unit 68 may revert to assigning version numbers to the content item, and handle it accordingly. During start-up of the application that consumes non-versioned data items, agent 44 will fetch them in real-time from the content source if a wireless network is available. If not, the most recent cached copy will be served.

In some embodiments, the processors in system 20 (e.g., one or more of the processors implementing prefetching subsystem 56, prefetch setting subsystem 52, content sources 24 and/or prefetch agent 44) may select the time intervals, in which the guaranteed prefetching mode is applied, differently for different content items. Additionally or alternatively, the processors may select the time intervals differently for different groups of communication terminals (and thus users). In an embodiment, the processors may apply the guaranteed prefetching mode continuously, for certain content (e.g., all hours of the day and/or all days of the week).

In an embodiment, the processors may apply the guaranteed prefetching mode for prefetching portions of the content that are immediately visible to the user when presented on communication terminal 28. Content that is not immediately visible may be prefetched using the best-effort mode. In the present context, the term "visible" refers to content that is displayed "above the fold," i.e., without requiring the user to scroll in order to view it. "Visibility" or "invisibility" is a static property of the content, and does not depend on the specific portion of content that the user is currently viewing. In a Web page, for example, the top of the page, which is displayed when reaching the page and without scrolling, is the visible part. The bottom of the page, which requires scrolling in order to be viewed, is regarded invisible. These definitions do not depend on whether the user is currently viewing the top or bottom of the page.

In an embodiment, for content that is immediately visible to the user, as defined above, the processors may apply the guaranteed prefetching mode during longer periods of time, e.g. for a larger percentage of the day. For content that is not immediately visible, the processors may apply the guaranteed prefetching mode during shorter periods of time.

In another embodiment, the processors may apply the guaranteed prefetching mode for prefetching portions of the content that are is accessible from the current display of the communication terminal. Such portions may comprise, for example, a video, image, or article available from a link accessible from the current display. Unlike the previous example, the designation of content as "accessible from the current display" is dynamic, and depends on the specific portion of content that the user is currently viewing. Content that is not accessible from the current display may be prefetched using the best-effort mode.

In yet another embodiment, the processors may apply the guaranteed prefetching mode for prefetching content that is part of a landing page (e.g., feed) of an application running in the communication terminal. Content that is not part of the landing page may be prefetched using the best-effort mode.

In some embodiments, the processors decide whether to apply the guaranteed prefetching mode to certain content based on a soft "visibility metric" that quantifies the "distance from visibility" of the content. The visibility metric is indicative of the amount of user actions and/or time needed at the terminal in order to make the content in question visible to the user. The embodiments given above, in which guaranteed prefetching is applied to visible content and best-effort prefetching is applied to non-visible content, can be viewed as a special case in which the visibility metric is binary.

The processors may use various kinds of soft visibility metrics. Several non-limiting examples of visibility metrics comprise the following:

Visibility metrics derived from the placement of the content in a Web page. For example, content that is visible on a Web page without scrolling may be assigned a higher visibility metric, while content that is non-visible without scrolling may be given a lower visibility metric. An another example, content that is visible in a Web page with less than a predefined amount of scrolling may be assigned a high visibility metric, while content requiring more than the predefined amount of scrolling to be viewed may be assigned a low metric.

Visibility metrics derived from the level of accessibility of the content within the current display. For example, content that is visible to the user on the current display may be assigned a high visibility metric, and vice versa (i.e., content that is not visible to the user on the current display may be assigned a low visibility metric). As another example, content that is visible anywhere on the current display may be assigned a high visibility metric, and vice versa. As yet another example, content that can be made visible from the current display with less than a predefined amount of scrolling may be assigned a high visibility metric. Content that requires more than the predefined amount of scrolling to be made visible (starting from the current display) may be assigned a low visibility metric.

Visibility metrics derived from the number of user actions, starting from the current display until the content is accessible. For example, content that can become visible from the current display with less than a predefined amount of user actions may be assigned a high visibility metric, and vice versa. In this context, user actions may comprise, for example, clicks on hyperlinks, checking of check-boxes, scrolls, drop-down menu selections, or any other suitable actions.

Visibility metrics derived from the time until the content becomes accessible. For example, content that can become visible within a short amount of time (e.g., below a predefined threshold) may be assigned a high visibility metric, and vice versa. In an example embodiment, content that is available near the beginning of a video or audio file (or e.g., contained within one of the first HLS frames of the video) can be assigned a high visibility metric, as opposed to content located later in the file. In another embodiment, content that is available following a click that usually responds in less than ten seconds can be assigned a high visibility metric, as opposed to content that becomes available after clicks that are slower to respond. The visibility metric may also be defined as some function of the amount of time until the content becomes accessible.

Visibility metrics derived from the accessibility of the content from a predefined starting point. An example starting point is a launcher of an application ("app"). For example, content that is available after one user action (e.g., click) from the launcher can be assigned a high visibility metric, whereas content that requires a larger number of user actions from the launcher may be assigned a lower metric. Another example starting point is the landing page of an app (including, for example, a home screen of a browser). For example, content that is available from the landing page without any user actions may be assigned a high visibility metric, and vice versa.

Visibility metrics based on combinations of the above metrics. For example, content that is available on the lading page of an app without scrolling may be assigned a high visibility metric, and vice versa. As another example, the first three HLS frames of video content that is available from a landing page of an app may be assigned a high visibility metric, and vice versa.

The list above is given purely by way of example. In alternative embodiments, any other suitable metric can be used. For example, the visibility metric may be formulated as a distance metric, in which smaller values indicate content closer to visibility, and higher values correspond to content requiring more time and/or user action to be viewed.

In some embodiments, the processors decide, based on the visibility metric of the content, whether to prefetch the content using the guaranteed prefetching mode or using the best-effort mode. In these embodiments, content that is closer to being visible will typically be prefetched using guaranteed prefetching, and vice versa.

In other embodiments, the processors activate the guaranteed mode, for certain content, for time durations whose length is based on the visibility metric of the content. Typically, the processors will set longer guaranteed-prefetching intervals for content that is closer to being visible, and vice versa.

In some embodiments, the processors may activate the guaranteed prefetching mode in response to an output of a sensor in communication terminal 28. The sensor output may be indicative, for example, of the usage pattern of the terminal by the user.

In some embodiments, the processors may choose to activate the guaranteed prefetching mode based on detection of one or more of the following:

Movement of communication terminal 28, e.g., if the terminal has moved recently.

The velocity of the terminal, e.g., if the velocity is below a predefined threshold.

Light exposure of the terminal, e.g., if the terminal is currently exposed to light.

Screen lock status of the terminal, e.g., if the screen is currently unlocked.

Battery level of the terminal, e.g., if the terminal battery is currently above a predefined threshold.

Charging status of the terminal, e.g., if the terminal is currently charging its battery.

Quality of network connection of the terminal, e.g., if the network connection is above some predefined quality level.

The type of network connection (e.g., fast WiFi connection as opposed to slow cellular connection).

In an embodiment, the processors may choose the guaranteed prefetching mode if the content in question is to be prefetched over a broadcast or multicast channel. Otherwise, best-effort prefetching is used. In another embodiment, the processors may choose the guaranteed prefetching mode for content that changes at a rate that is below a predefined threshold.

In some embodiments, the processors may choose the guaranteed prefetching mode for content whose level of security is high, or needs to be high. Content having a lower level of security may be prefetched using the best-effort mode. The rationale behind this criterion is that improving the security level of a content item often involves more computations and therefore may incur higher latency (relative to content having a lower level of security). Latency may be incurred on the network side (e.g., due to encryption at the content source) and/or on the terminal side (e.g., due to decryption). When the content is fetched and consumed in real-time, such latency may be prohibitive. When the content is prefetched in advance, the latency incurred by the added security is less critical and can be tolerated. Therefore, it may be beneficial to assign guaranteed-prefetching resources to content that needs to have a high level of security.

In some embodiments, the processors prefetch the content by delivering one or more incremental updates, relative to the content that is already cached in the terminal.

In some embodiments, the processors (e.g., prefetch subsystem 56) continuously track given content on a content source by executing Java scripts (or other executable scripts found in the given content) in the cloud (or otherwise in any network-side node), and identify content that is accessed by the scripts.

In other embodiments, the processors prefetch Java scripts (or other executable scripts found in the given content) to terminal 28, execute the scripts in advance in the terminal, and in this manner identify and prefetch additional content that is accessed by the scripts.

Although the embodiments described herein mainly address content prefetching for wireless terminals, the methods and systems described herein can also be used in other applications, such as in prefetching for wire-line terminals such as personal computers with wire-line connection to the Internet.

Although the embodiments described herein refer mainly to prefetching from Web-sites, the disclosed techniques can also be used for prefetching content from various intermediate entities. Such intermediate entities, which are also regarded herein as types of content sources, may comprise, for example, other mobile devices that possess the content items, computer servers, proxy caches, or any other suitable entity. When the intermediate comprises another mobile device, the content may be fetched utilizing direct device-to-device wireless link.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for content delivery, comprising:

selecting one or more time intervals;

during each time interval among the selected time intervals, prefetching given content from a content source to a communication terminal using a guaranteed prefetching mode, by:

continuously tracking the given content on the content source, so as to detect changes to the given content as they occur during the selected time interval; and maintaining the communication terminal continuously synchronized with the content source with respect to the given content, throughout the selected time interval, notwithstanding the changes that occur during the selected time interval, by continuously prefetching at least part of the given content from the content source to the communication terminal; and outside of the one or more selected time intervals, prefetching the given content from the content source to the communication terminal using a best-effort prefetching mode, by tracking the given content less frequently than the guaranteed prefetching mode.

2. The method according to claim 1, wherein selecting the time intervals comprises:

selecting one or more first time intervals for a first content item; and selecting one or more second time intervals, different from the first time intervals, for a second content item different from the first content item.

3. The method according to claim 1, wherein selecting the time intervals comprises:

selecting one or more first time intervals when the communication terminal belongs to a first group of communication terminals; and selecting one or more second time intervals, different from the first time intervals, when the communication terminal belongs to a second group of communication terminals different from the first group.

4. The method according to claim 1, wherein selecting the time intervals comprises applying the guaranteed prefetching mode continuously for a specified content item.

5. The method according to claim 1, wherein selecting the time intervals comprises:
assigning, to portions of the given content, respective visibility metrics that are indicative of one or more of (i) respective times and (ii) respective amounts of user actions, needed to make the portions of the given content visible to a user; and
selecting the time intervals based on the visibility metrics.

6. The method according to claim 5, wherein selecting the time intervals comprises choosing whether to apply the guaranteed prefetching mode or the best-effort prefetching mode to a portion of the given content, depending on a visibility metric assigned to the portion.

7. The method according to claim 5, and comprising setting a length of time during which a portion of the given content is prefetched using the guaranteed prefetching mode, depending on a visibility metric assigned to the portion.

8. The method according to claim 1, wherein selecting the time intervals comprises applying the guaranteed prefetching mode for prefetching a portion of the given content that is visible without scrolling when presented on the communication terminal, and applying the best-effort prefetching mode for prefetching a part of the given content that requires scrolling to be visible.

9. The method according to claim 1, and comprising:
for first content that is visible without scrolling when presented on the communication terminal, applying the guaranteed prefetching mode during first time intervals; and
for second content that requires scrolling to be visible, applying the guaranteed prefetching mode during second time intervals, shorter than the first time intervals.

10. The method according to claim 1, wherein selecting the time intervals comprises applying the guaranteed prefetching mode for prefetching a portion of the given content that is available on a landing page of an application, and applying the best-effort prefetching mode for prefetching a part of the given content that is not available on the landing page.

11. The method according to claim 1, wherein selecting the time intervals comprises applying the guaranteed prefetching mode for prefetching a portion of the given content that is accessible from a current display of the communication terminal, and applying the best-effort prefetching mode for prefetching a part of the given content that is not accessible from the current display.

12. The method according to claim 1, wherein selecting the time intervals comprises activating the guaranteed prefetching mode in response to an output of a sensor in the communication terminal.

13. The method according to claim 1, wherein selecting the time intervals comprises activating the guaranteed prefetching mode depending on one or more of:
a movement of the communication terminal;
a velocity of the communication terminal;
exposure of the communication terminal to light;
a screen-lock status of the communication terminal;
a battery level of the communication terminal;
a charging status of the communication terminal;
a quality of a network connection of the communication terminal; and
a type of the network connection.

14. The method according to claim 1, wherein selecting the time intervals comprises applying the guaranteed prefetching mode for prefetching a portion of the given content that is to be prefetched over a broadcast or multicast channel.

15. The method according to claim 1, wherein selecting the time intervals comprises applying the guaranteed prefetching mode for prefetching a portion of the given content that changes at a rate that is lower than a predefined threshold, and applying the best-effort prefetching mode for prefetching a part of the given content that changes at a rate that is above the predefined threshold.

16. The method according to claim 1, wherein selecting the time intervals comprises applying the guaranteed prefetching mode for prefetching a portion of the given content having a level of security that is above a predefined threshold, and applying the best-effort prefetching mode for prefetching a part of the given content having a level of security that is below the predefined threshold.

17. The method according to claim 1, wherein prefetching the given content comprises delivering to the communication terminal one or more differential updates, relative to content that is already available in the communication terminal.

18. The method according to claim 1, wherein continuously tracking the given content comprises executing, in a network-side node, an executable script that is found in the given content, and identifying and prefetching content accessed by the script.

19. The method according to claim 1, wherein prefetching the given content comprises prefetching an executable script that is found in the given content, executing the prefetched script in advance in the communication terminal, and further prefetching content accessed by the script.

20. A content delivery system, comprising:
an interface for communicating with a content source and with a communication terminal of a user; and
one or more processors, which are configured to:
select one or more time intervals;
during each time interval among the selected time intervals, prefetch given content from the content source to the communication terminal using a guaranteed prefetching mode, by:
continuously tracking the given content on the content source, so as to detect changes to the given content as they occur during the selected time interval; and
maintaining the communication terminal continuously synchronized with the content source with respect to the given content, throughout the selected time interval, notwithstanding the changes that occur during the selected time interval, by continuously prefetching at least part of the given content from the content source to the communication terminal; and
outside of the one or more selected time intervals, prefetch the given content from the content source to the communication terminal using a best-effort prefetching mode, by tracking the given content less frequently than the guaranteed prefetching mode.

21. The system according to claim 20, wherein the processors are configured to:
select one or more first time intervals for a first content item; and
select one or more second time intervals, different from the first time intervals, for a second content item different from the first content item.

22. The system according to claim 20, wherein the processors are configured to:
  select one or more first time intervals when the communication terminal belongs to a first group of communication terminals; and
  select one or more second time intervals, different from the first time intervals, when the communication terminal belongs to a second group of communication terminals different from the first group.

23. The system according to claim 20, wherein the processors are configured to apply the guaranteed prefetching mode continuously for a specified content item.

24. The system according to claim 20, wherein the processors are configured to:
  assign, to portions of the given content, respective visibility metrics that are indicative of one or more of (i) respective times and (ii) respective amounts of user actions, needed to make the portions of the given content visible to a user; and
  select the time intervals based on the visibility metrics.

25. The system according to claim 24, wherein the processors are configured to choose whether to apply the guaranteed prefetching mode or the best-effort prefetching mode to a portion of the given content, depending on a visibility metric assigned to the portion.

26. The system according to claim 24, wherein the processors are configured to set a length of time during which a portion of the given content is prefetched using the guaranteed prefetching mode, depending on a visibility metric assigned to the portion.

27. The system according to claim 20, wherein the processors are configured to apply the guaranteed prefetching mode for prefetching a portion of the given content that is visible without scrolling when presented on the communication terminal, and to apply the best-effort prefetching mode for prefetching a part of the given content that requires scrolling to be visible.

28. The system according to claim 20, wherein the processors are configured to:
  for first content that is visible without scrolling when presented on the communication terminal, apply the guaranteed prefetching mode during first time intervals; and
  for second content that requires scrolling to be visible, apply the guaranteed prefetching mode during second time intervals, shorter than the first time intervals.

29. The system according to claim 20, wherein the processors are configured to apply the guaranteed prefetching mode for prefetching a portion of the given content that is available on a landing page of an application, and to apply the best-effort prefetching mode for prefetching a part of the given content that is not available on the landing page.

30. The system according to claim 20, wherein the processors are configured to apply the guaranteed prefetching mode for prefetching a portion of the given content that is accessible from a current display of the communication terminal, and to apply the best-effort prefetching mode for prefetching a part of the given content that is not accessible from the current display.

31. The system according to claim 20, wherein the processors are configured to activate the guaranteed prefetching mode in response to an output of a sensor in the communication terminal.

32. The system according to claim 20, wherein the processors are configured to activate the guaranteed prefetching mode depending on one or more of:
  a movement of the communication terminal;
  a velocity of the communication terminal;
  exposure of the communication terminal to light;
  a screen-lock status of the communication terminal;
  a battery level of the communication terminal;
  a charging status of the communication terminal;
  a quality of a network connection of the communication terminal; and
  a type of the network connection.

33. The system according to claim 20, wherein the processors are configured to apply the guaranteed prefetching mode for prefetching a portion of the given content that is to be prefetched over a broadcast or multicast channel.

34. The system according to claim 20, wherein the processors are configured to apply the guaranteed prefetching mode for prefetching a portion of the given content that changes at a rate that is lower than a predefined threshold, and to apply the best-effort prefetching mode for prefetching a part of the given content that changes at a rate that is above the predefined threshold.

35. The system according to claim 20, wherein the processors are configured to apply the guaranteed prefetching mode for prefetching a portion of the given content having a level of security that is above a predefined threshold, and to apply the best-effort prefetching mode for prefetching a part of the given content having a level of security that is below the predefined threshold.

36. The system according to claim 20, wherein the processors are configured to prefetch the given content by delivering to the communication terminal one or more differential updates, relative to content that is already available in the communication terminal.

37. The system according to claim 20, wherein the processors are configured to execute, in a network-side node, an executable script that is found in the given content, and to identify and prefetching content accessed by the script.

38. The system according to claim 20, wherein the processors are configured to prefetch the given content by prefetching an executable script that is found in the given content, executing the prefetched script in advance in the communication terminal, and further prefetching content accessed by the script.

39. A computer software product, the product comprising a tangible non-transitory computer-readable medium in which program instructions are stored, which instructions, when read by one or more processors of a content delivery system that communicates with a content source and a communication terminal of a user, cause the one or more processors to:
  select one or more time intervals;
  during each time interval among the selected time intervals, prefetch given content from the content source to the communication terminal using a guaranteed prefetching mode, by:
    continuously tracking the given content on the content source, so as to detect changes to the given content as they occur during the selected time interval; and
    maintaining the communication terminal continuously synchronized with the content source with respect to the given content, throughout the selected time interval, notwithstanding the changes that occur during the selected time interval, by continuously prefetching at least part of the given content from the content source to the communication terminal; and
  outside of the one or more selected time intervals, prefetch the given content from the content source to the communication terminal using a best-effort prefetching mode, by tracking the given content less frequently than the guaranteed prefetching mode.

* * * * *